United States Patent [19]

Yu

[11] Patent Number: 5,274,465
[45] Date of Patent: Dec. 28, 1993

[54] DOCUMENT CONVEYING CIRCUIT FOR USE IN A FACSIMILE SYSTEM

[75] Inventor: Seung-Woo Yu, Seoul, Rep. of Korea

[73] Assignee: SamSung Electronics Co. Ltd., Suwon, Rep. of Korea

[21] Appl. No.: 942,137

[22] Filed: Sep. 8, 1992

Related U.S. Application Data

[63] Continuation of Ser. No. 418,220, Oct. 6, 1989, abandoned.

[30] Foreign Application Priority Data

Apr. 15, 1989 [KR] Rep. of Korea .................. 1989-4976

[51] Int. Cl.⁵ .......................... H04N 1/00; H04N 1/04
[52] U.S. Cl. ..................................... 358/400; 358/486; 358/498
[58] Field of Search ............... 358/400, 474, 486, 494, 358/496, 498; 355/308

[56] References Cited

U.S. PATENT DOCUMENTS 4,432,023  2/1984  Mehalek .......................... 358/496

Primary Examiner—Edward L. Coles, Sr.
Assistant Examiner—Thomas D. Lee
Attorney, Agent, or Firm—Robert E. Bushnell

[57] ABSTRACT

A document conveying circuit for use in a facsimile system capable of manually conveying a document and supplementing for the low conveying speed of a document by means of a manual conveying method. The circuit compensates for discontinuous and irregular speed of a manual document conveying process. The inventive subject includes a first sensor for detecting a conveying distance of a document, a codec for coding the output signal from a picture signal processor and decoding the data of a memory, a memory for storing the output signal of said codec, a data processor for controlling said codec and a memory, an error indicator for indicating a speed error in response to the document conveying speed, a conveying distance detector, a first timer for controlling the second sensor controller, and a second timer for controlling the picture signal processor.

21 Claims, 3 Drawing Sheets

DOCUMENT CONVEYING CIRCUIT FOR USE IN A FACSIMILE SYSTEM

This is a continuation of application Ser. No. 07/418,220 filed on Oct. 6, 1989.

BACKGROUND OF THE INVENTION

The present invention relates to a document conveying circuit for use in a facsimile system, and in particular to a document conveying circuit capable of manually conveying a document.

In general, a facsimile system reads a document with a scanner while conveying automatically the document by the rotation of a motor. An example of document conveying by rotation of a motor will be explained with reference to a conventional circuit diagram shown in FIG. 1.

Referring to a configuration of FIG. 1, the known document conveying circuit includes: a stepping motor 2 for rotating a conveying roller 1; a stepping motor controller SMC 3 for controlling stepping motor 2; a sensor controller 5 for obtaining a desired pictorial image signal by controlling a sensor 4 hereinafter described; a sensor 4 for reading the document 8 by means of reflected light of a light source 7 under the control of sensor controller 5; and a picture signal processor 6 for processing the output received from sensor 4.

It will be explained about an operation in a copy mode which is performed at the regular conveying speed of a document according to above-described configuration, in the following discussion.

Firstly, an output signal "a" of the stepping motor controller 3, as shown in FIGS. 2A to 2D, drives the stepping motor 2 and renders the conveying roller 1 to convey the document 8 by one line (1/7.7 mm or 1/3.85 mm) for a period of time t1, and the sensor 4 is driven by a sensor trigger signal "b" provided by the sensor controller 5. Sensor trigger signal "b" is like the wave forms in FIGS. 2E and 3A, and the document is read in by accumulating the reflecting light for the period corresponding to the time t1 until the next sensor trigger signal "b" is produced.

When a second sensor trigger signal "b" for starting reading of the next line is produced, image information being accumulated is transmitted into one or two internal shift registers of the sensor 4, the sensor driving clock "c" provided by the sensor controller 5 transmits the image signal transmitted into these internal shift registers to the picture processor 6 by one picture element, one by one, through an output line "e" of the sensor. Wave forms of FIGS. 3B and 3C being respective wave forms of driving clock "c" from the sensor 4, when the shift register is one in number, it appears with double frequency, and wave form of FIG. 3E is the image information applied to the picture signal processor 6 through the output line "e" of the sensor 4. A wave form of FIG. 3D is a reset signal inputted into the sensor 4 through a line "d" which is for clearing energy of the picture element transmitted before receiving energy with respect to the next picture element.

Picture signal processor 6 counts a number of inputted picture element signals and takes only a necessary part thereof. Further, when a third sensor trigger signal is produced on the line "b" the light information starts to be accumulated with respect to a third line L3 of the document and, with the same method as aforementioned, the image signal with respect to second line L2 is transmitted to the picture signal processor 6 through the output line "e" of the sensor 4.

The aforementioned system has a problem that the apparatus becomes larger in its size because it requires various supplementary parts such as a conveying roller 1 and a stepping motor 2, a stepping motor controller 3, a gear device for transmitting the motive power of the stepping motor 2 to the conveying roller 1, and the like.

OBJECT OF THE INVENTION

Therefore, it is an object of the present invention to provide a document conveying circuit for use in a facsimile system capable of manually conveying a document.

It is another object of the present invention to provide a circuit for compensating for the discontinuous and irregular speed of a manual document conveying process.

It is a further object of the present invention to provide a document conveying circuit capable of supplementing for the low conveying speed of a document by means of a manual conveying method.

SUMMARY OF THE INVENTION

These and other objects are achieved with a document conveying circuit for use in a facsimile system capable of manually conveying a document while supplementing for the low conveying speed of a document by means of a manual conveying technique. The circuit compensates for discontinuous and irregular speed of a manual document conveying process, by using a first sensor for detecting a conveying distance of a document, a codec for coding the output signal from a picture signal processor and decoding the data of a memory, a memory for storing the output signal of the codec, a data processor for controlling the codec and the memory, an error indictor for indicating a speed error in response to the document conveying speed, a conveying distance detector, a first timer for controlling the second sensor controller, and a second timer for controlling the picture signal processor.

BRIEF DESCRIPTION OF THE DRAWINGS

For a better understanding of the invention, and to show how the same may be carried out into effect, reference will now be made, by way of example, to the accompanying drawings, in which:

FIGS. 5A to 5E are wave form charts illustrating respective signals of and from respective means in a circuit of a preferred embodiment of the present invention, wherein:

DETAILED DESCRIPTION OF THE INVENTION

Hereinafter, the present invention will be described in detail with reference to the accompanying drawings.

Figure 4:
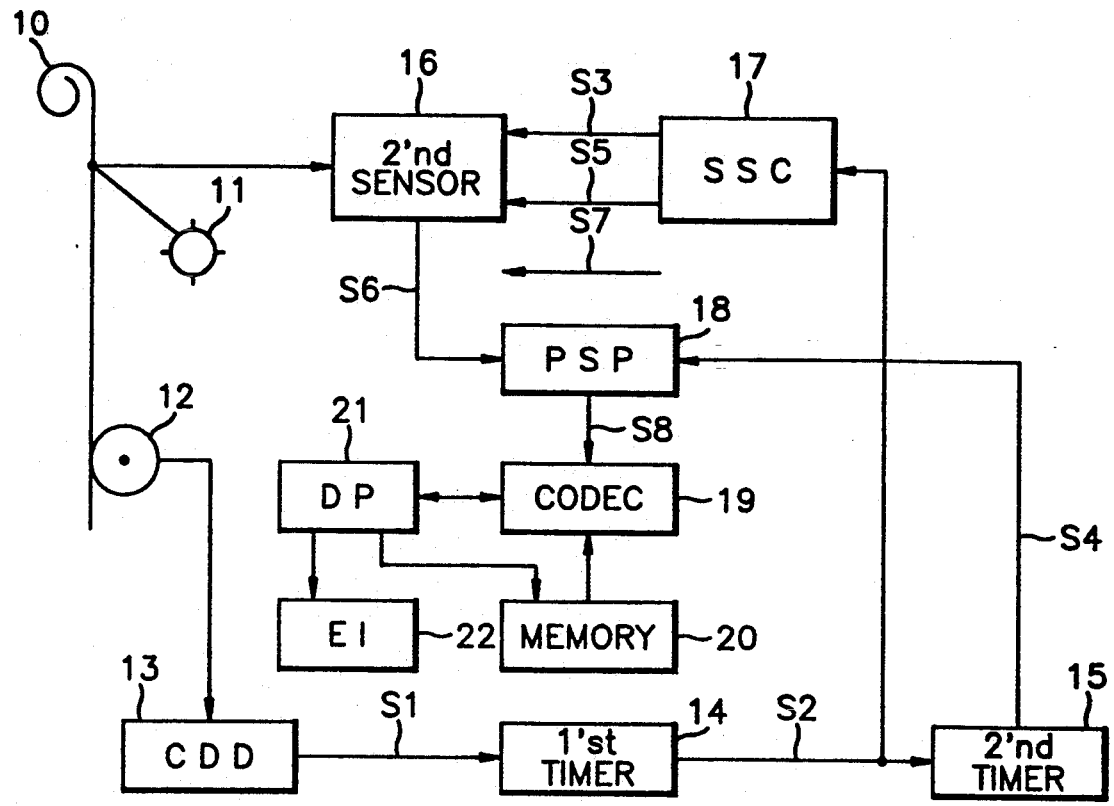
FIG. 4 is a block diagram of a preferred embodiment according to the present invention.

FIG. 4 is a block diagram of a preferred embodiment of the present invention, in which the invention includes: a first sensor 12 for detecting a conveying distance of a document; a conveying distance detector CDD 13 for receiving the output of said first sensor 12 and changing it into information S1 representing the conveying distance; a first timer 14 for arranging uniformly the exposure time of an output signal of said conveying distance detector 13 by the line; a second timer 15 for receiving the output signal S2 of the first timer 14 and controlling hereafter-described picture signal processor PSP 18 and discriminating either necessary data and/or unnecessary data; a second sensor 16 for reading in the document 10 by means of a reflecting light of the light source 11; a second sensor controller SSC 17 for receiving the output S2 of said first timer 14 and controlling said second sensor 16; a picture signal processor PSP 18 for receiving the output S6 of said second sensor 16, converting it to a digital signal and taking only desired data from the output of the second sensor 16; a codec 19 for receiving the output S8 of said picture signal processor 18, coding it and decoding the data of hereafter-described memory 20; a memory 20 for storing the output of said codec 19; a data processor DP 21 for controlling said codec 19 and said memory 20; and an error indicator EI 22 for indicating an error related to the document conveying speed by said data processor DP 21.

FIGS. 5A to 5E are wave from charts of the document conveying circuit according to the present invention, in which:

FIG. 5A shows an output signal S1 of the conveying distance detector means 13;

FIG. 5B shows an output signal S2 of the first timer 14;

FIG. 5C shows a trigger signal S3 from second sensor controller 17;

FIG. 5D shows an output signal S4 of the second timer 15; and

FIG. 5E shows a clock signal S5 from the second sensor controller 17.

Figure 5:
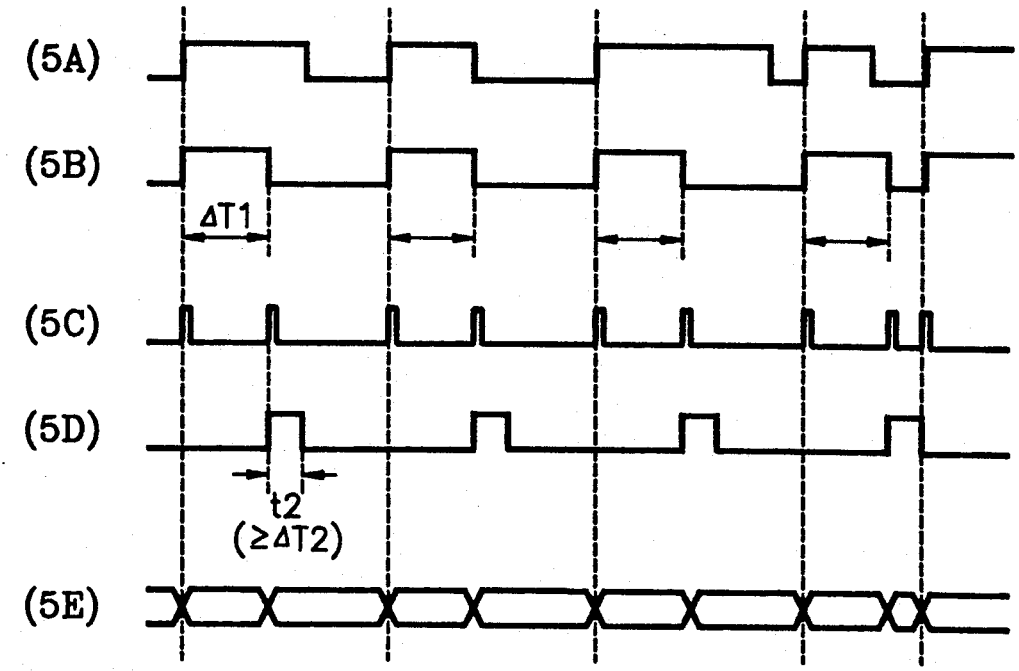

The operation of the present invention will now be described in detail hereinafter with reference to FIGS. 4 and 5. The first sensor 12 detects the conveying distance of the document and its distance difference, and provides the information with respect to it to the conveying distance detector means 13, while the conveying detector means 13 receives the information from the first sensor 12 to make it into a square wave of 50:50 duty ratio in case of normal speed.

Signal S1 of the conveying distance detector means 13 is an output which is made when changing the distance by the line unit (1/7.7 mm or 1/3.85 mm). Because of an irregular speed operation upon a manual conveying, the duty ratio and period are different from each other as the wave form shown in FIG. 5A. Further, the exposure time required for a characteristic of the second sensor 16 is $\Delta T1$, and a minimum time that total picture elements composing one line are completely transmitted to the picture signal processor means 18 is $\Delta T2$. Therefore, a maximum allowable document conveying speed Vs is defined as following Equation (1), $$Vs = \frac{1}{\Delta T1 + \Delta T2} \text{ (line/sec.)} \quad (1)$$

where the line is 1/7.7 mm or 1/3.85 mm

In case that the document conveying speed is over the above-defined speed Vs, the data can not be read in. When the output signal S1 of said conveying distance detector means 13 is applied to the first timer 14, the first timer 14 transits into logic high state at a rising edge of the output signal S1 and counts the period of time $\Delta T1$ of FIG. 5B. Thereafter, it is changed into logic low state again and controls the exposure time uniformly for each line.

Figure 1:
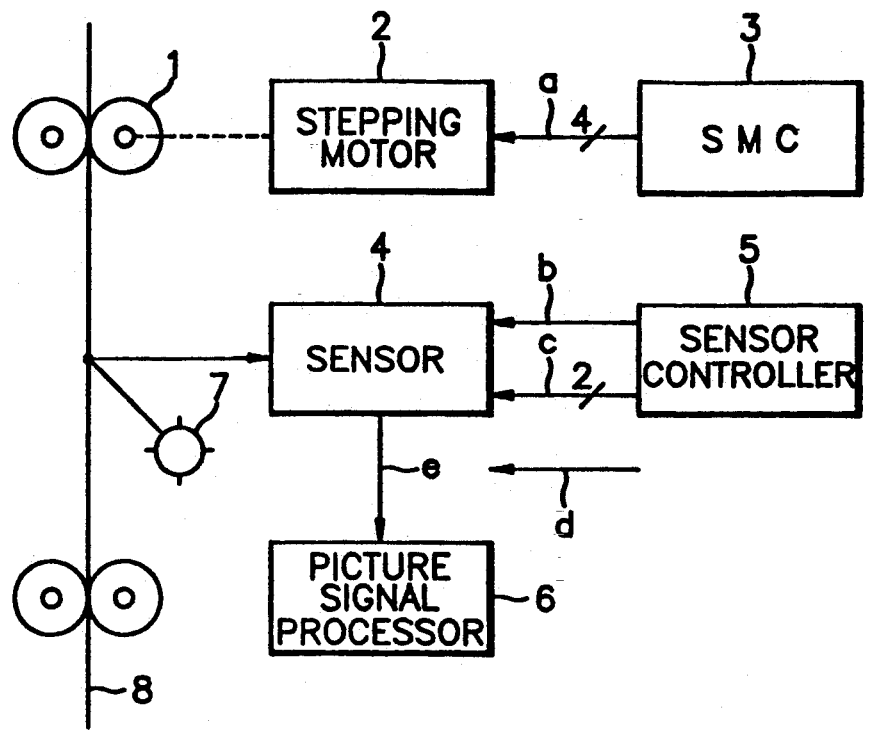
FIG. 1 is a block diagram of a conventional document conveying device of a facsimile.
Figure 2:
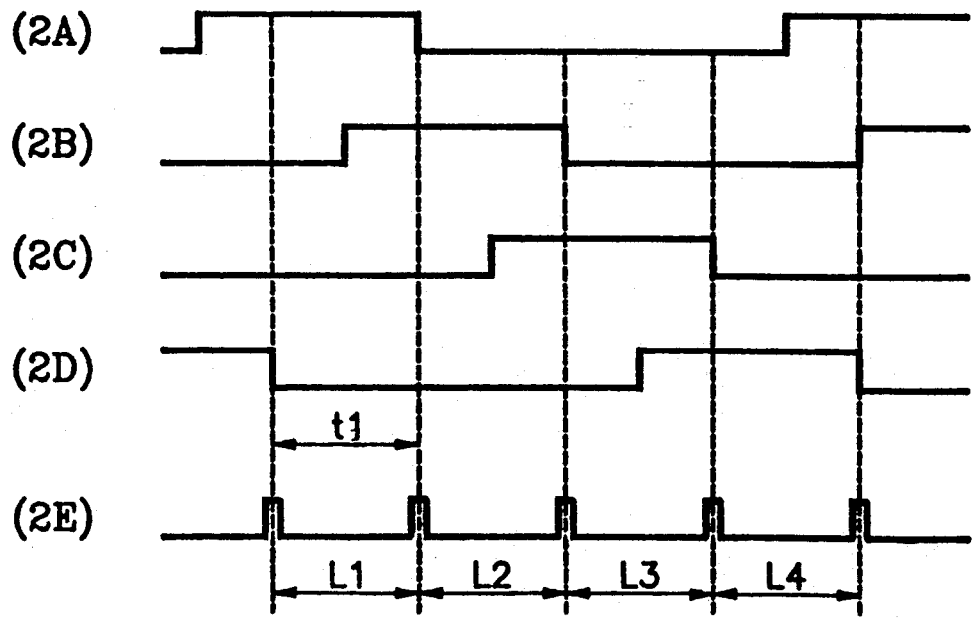
FIGS. 2A to 2E are wave form charts of a conventional document conveying circuit.
Figure 3:
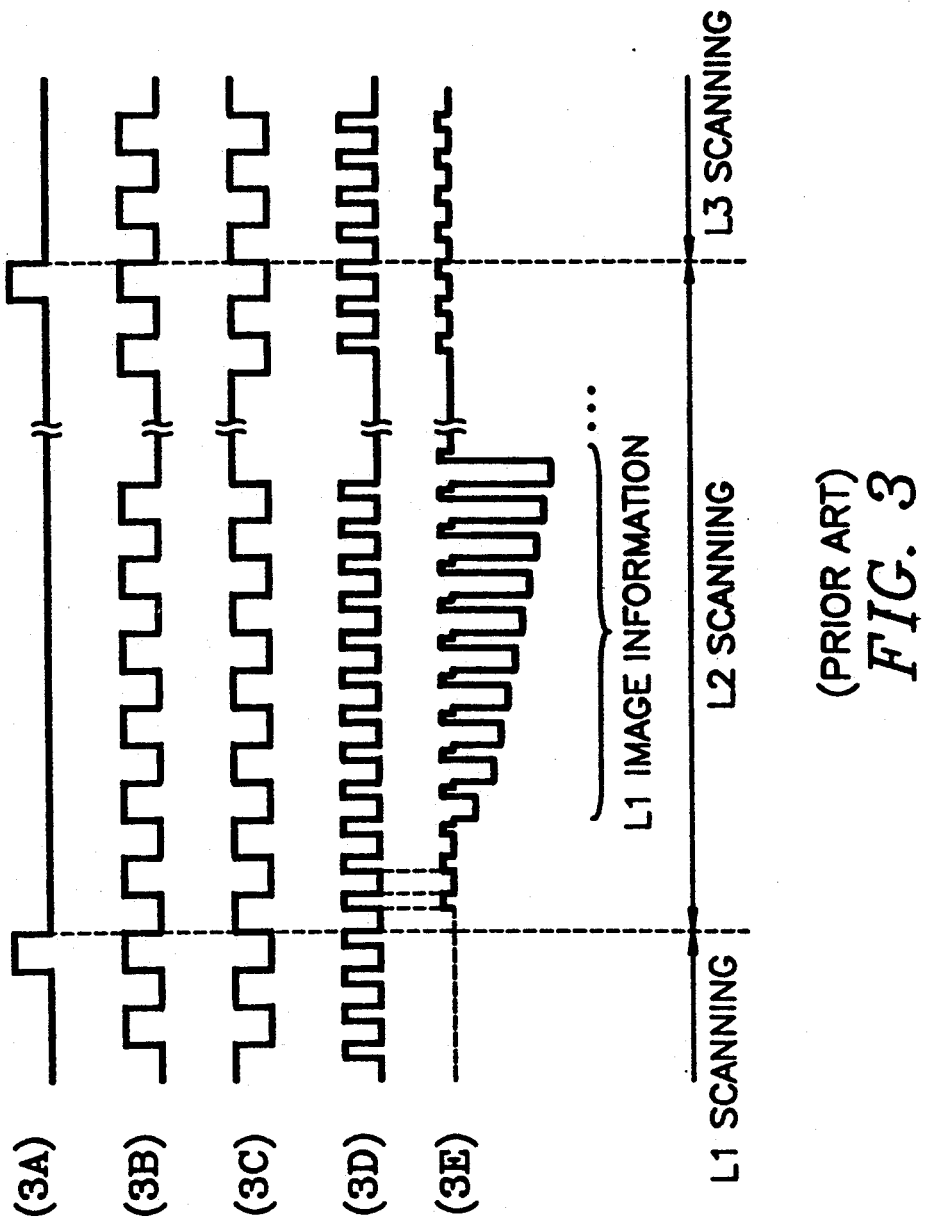
FIGS. 3A to 3E are specific wave form charts of a conventional document conveying circuit.

Output signal S2 of the first timer 14 is the signal in a normal low state, as is shown in FIG. 5B. Output signal S2 of the first timer 14 is applied to the second timer 15 and the second sensor controller 17. Second sensor controller 17 detects the rising and falling edge of the inputted signal S2 and produces a trigger signal S3 of a wave form in FIG. 5C. When trigger signal S3 is activated, the second sensor 16 executes the same action as the sensor 4 of the conventional circuit FIG. 1, and the wave forms at this time also equal the waveforms of FIGS. 2A to 3E. That is to say, an output signal S6 of the second sensor 16 equals a wave form of FIG. 3E inputted to the picture signal processor 18 and a reset signal S7 of the second sensor 16 also equals the wave form of FIG. 3D. Since output signal S6 contains unnecessary data, a signal for discriminating between these unnecessary data is required.

A signal for discriminating between the unnecessary and necessary components of the output signals S6 of the second sensor 16 is an output signal S4 of said second timer 15, and the output signal S4 is converted again to the normal state after receiving the output signal S2 of the first timer 14 and passing the exposure time, that is, being activated at the falling edge of the output signal S2, and counting a period of time t2 of more than $\Delta T2$. The output signal S4 of said second timer 15 is the same as the wave form of FIG. 5D and the picture signal processor 18 acknowledges only the output of the second sensor 16 inputted during the output signal S4 being in logic high state as the image data required actually, and after converting the image data into digital signals, distortion and noise are compensated.

A compensated signal S8 is applied in the codec 19 and stored to the memory 20 through the coding process by a real time process. The data processor 21 for controlling said codec 19 and the memory 20, when the coding period of time at the codec 19 becomes lengthened and the period of time that coded data is stored in the memory 20 becomes long, that is, when a large amount of the data which has a lower speed than the aforementioned maximum allowable document conveying speed is applied to the codec 19, informs such situation to a user through the error indicator 22, so that a function for preventing the loss of data is executed. The information stored in the memory 20 by said method may be used according to the application in a transmission or copy mode.

As described above, according to the invention, since the document conveyance is executed manually, it is capable of compensating for a conveyance of the document that is discontinuous and irregular in speed produced by this conveyance but it does not require the apparatus that has been used heretofore. There is accordingly an advantage that it is possible to manufacture low-cost equipment which is compact and also convenient to carry.

It will be appreciated that the present invention is not restricted to the particular embodiment that has been described hereinbefore, and that variations and modifications may be made therein without departing from the spirit and scope of the invention as defined in the appended claims and equivalents thereof.

What is claimed is:

1. A document conveying apparatus of a facsimile system having first sensor means for reading contents of a document to produce document images from said contents, and picture signal processor means for receiving data representing contents of said document, comprising:
   second sensor means for detecting and providing an intermediate signal on a basis of a conveying distance of said document;
   conveying compensation means for uniformly arranging exposure time on the basis of said intermediate signal, for controlling said first sensor means, and for discriminating of data received by said picture signal processor means;
   codec means responsive to coding periods, for coding a first output signal received from said picture signal processor means, for providing an information indicative of a document conveying speed, and for decoding stored data;
   memory means for storing a second output signal from said code means, as said stored data;
   data processor means for controlling said code means and said memory means in dependence upon said coding periods; and
   error indicator means for indicating a speed error in response to said information indicative of said document conveying speed.

2. The document conveying apparatus according to claim 1, wherein said conveying compensation means further comprises:
   conveying distance detector means for changing the intermediate signal of said second sensor means on the basis of the conveying distance, to provide a third output signal;
   first timer means for generating a fourth output signal for controlling said first sensor means in dependence upon the third output signal from said conveying distance detector means; and
   second timer means for generating a fifth output signal for controlling said picture signal processor means on the basis of the fourth output signal of said first timer means.

3. The document conveying apparatus according to claim 2, wherein the fourth output signal of said first timer means transits from a logic low stage and into a logic high state at the rising edge of the third output signal of said conveying distance detector means and counts a first period of time T1, thereafter returning again to a logic low state.

4. The document conveying apparatus according to claim 3, wherein the fifth output signal of said second timer means exhibits a logic high state at the falling edge of the fourth output signal of said first timer means and counts a period of time T2, thereafter returning again to a logic low state.

5. The document conveying apparatus according to claim 4, wherein said data received by said picture processor means is received only while the fifth output signal is in a logic high state.

6. The document conveying apparatus according to claim 5, wherein said error indicator means senses the conveying time required for conveying the data coded by the coding time of the codec means, and generates an error signal indicating said speed error in response to said information indicative of said document conveying speed.

7. A document facsimile control circuit, comprising:
   first sensor means for detecting movement of a document to determine a conveying distance of said document, and for producing a first signal having a plurality of states in response to detection of said movement;
   second sensor means for producing during a first state of said first signal, a second signal representative of contents of said document; and
   means coupled to receive said first signal, for processing data representing an image from the contents of said document based upon reception of said second signal during a timing period initiated by but subsequent to said first state of said first signal, said timing period is initiated on a basis of said conveying distance.

8. The document facsimile control circuit of claim 7, wherein said first sensor means comprises:
   first means for generating a third signal indicating movement of said document; and
   first timer means for generating said first signal in response to reception of said third signal, with said first signal exhibiting a first state during a set duty cycle.

9. The document facsimile control circuit of claim 8, wherein said processing means comprises:
   second timer means for generating a fourth signal having a first state initiated by a change in said states of said first signal, said first state of said fourth signal differing in occurrence from said first state of said first signal; and
   signal processor means for performing said processing of the data representing image from the contents of said document during said first state of said fourth signal.

10. The document facsimile control circuit of claim 8, wherein said processing means comprises:
    second timer means for generating a fourth signal having a first state initiated by a change in said states of said first signal, said first state of said fourth signal differing in occurrence from said first state of said first signal; and
    signal processor means for limiting reception of said second signal to an interval set by said first state of said fourth signal, and for processing data representing an image from the contents of said document received during said interval.

11. The document facsimile control circuit of claim 7, wherein said processing means comprises:
    first timer means for generating a third signal having a first state initiated by a change in said states of said first signal, said first state of said third signal differing in occurrence from said first state of said first signal; and
    signal processor means for processing data representing an image from the contents of said document during said first state of said third signal.

12. The document facsimile control circuit of claim 7, wherein said processing means comprises:
    first timer means for generating a third signal having a first state initiated by a change in said states of said first signal, said first state of said third signal differing in occurrence from said first state of said first signal; and
    signal processor means for limiting reception of said second signal to an interval set by said first state of said third signal, and for performing said processing of the data representing an image from the contents of said document received during said interval.

13. A document facsimile control circuit, comprising:
means for producing a first signal having a plurality of states by detecting movement of a document to determine a conveying distance of said document, and for producing during a first period occurring during a first state of said first signal, a second signal representative of contents of said document; and
means coupled to receive said first signal, for processing data representing an image of the contents based upon reception of said second signal during a second period of different duration occurring after said first period, said second period is initiated on a basis of said conveying distance.

14. The document facsimile control circuit of claim 13, wherein:
said first signal producing means includes first timer means for generating said first signal in response to the detected movement of said document; and
said data processing means comprises second timer means for generating a third signal having a first state initiated by a change in said states of said first signal, said first state of said third signal differing in occurrence from said first state of said first signal.

15. The document facsimile control circuit of claim 13, wherein said data processing means comprises:
first timer means for generating a third signal having a first state initiated by a change in said states of said first signal, said first state of said third signal differing in occurrence from said first state of said first signal; and
signal processor means for processing data representing an image from the contents of said document during said first state of said third signal.

16. The document facsimile control circuit of claim 15, wherein said first signal producing means comprises:
first means for generating a fourth signal indicating said movement of said document; and
second timer means for generating said first signal in response to reception of said fourth signal, with said first signal exhibiting a first state during a set duty cycle.

17. The document facsimile control circuit of claim 13, wherein said first signal producing means comprises:
first means for generating a third signal indicating said movement of said document; and
first timer means for generating said first signal in response to reception of said third signal, with said first signal exhibiting a first state during a set duty cycle.

18. A document facsimile control circuit, comprising:
first sensor means for detecting movements of a printable medium to determine a conveying distance of said printable medium, and for providing a first sensed signal having a plurality of states in dependence upon detection of said movements;
first timer means for providing a first timing signal in dependence upon an uniform arrangement of an exposure time of said first sensed signal for a set duty cycle;
second timer means for providing a second timing signal in dependence upon said first timing signal;
second sensor means for detecting contents of said printable medium to provide second sensed signal in dependence upon reception of said first timing signal during a first state of said first sensed signal; and
means for processing data representing an image from the contents of said printable medium from said second sensed signal in dependence upon said second timing signal.

19. The document facsimile control circuit as claimed in claim 18, wherein said data processing means comprises:
picture signal processor means for discriminating the contents of said printable medium from said second sensed signal in accordance with said second timing signal to provide a discriminated signal;
means for coding said discriminated signal and memorizing the coded signal onto a memory, and for decoding the memorized coded signal in dependence upon information indicative of a conveying speed; and
means for indicating a speed error in dependence upon a comparison of said information indicative of said conveying speed and an allowable conveying speed.

20. A process for conveying documents in a facsimile system, comprising the steps of:
detecting movements of a printable medium to determine a conveying distance of said printable medium for generating a first sensed signal having a plurality of states in dependence upon detection of said movements;
generating timing signals in dependence upon exposure time of said first sensed signal for a set duty cycle;
detecting contents of said printable medium to generate a second sensed signal in dependence upon a first one of said timing signals during a first state of said first sensed signal; and
processing data representing an image from the contents of said printable medium from said second sensed signal in dependence upon a second one of said timing signals.

21. The process as claimed in claim 20, wherein said data processing step comprises the steps of:
discriminating the contents of said printable medium from said second sensed signal in accordance with said second one of said timing signals to generate a discriminated signal;
encoding said discriminated signal, memorizing the encoded signal, and decoding the memorized coded signal in dependence upon information indicative of a conveying speed; and
indicating a speed error in dependence upon a comparison of said information indicative of said conveying speed and an allowable conveying speed.

* * * * *